United States Patent [19]

Boissevain et al.

[11] Patent Number: 5,063,682

[45] Date of Patent: * Nov. 12, 1991

[54] AERODYNAMIC CALIPER GAUGE

[75] Inventors: Mathew G. Boissevain, Los Altos; Michael K. Norton, Los Gatos; ANthony D. Foskett, San Jose; Tobias J. Boissevain, Mountain View, all of Calif.

[73] Assignee: Measurex Corporation, Cupertino, Calif.

[*] Notice: The portion of the term of this patent subsequent to Feb. 20, 2007 has been disclaimed.

[21] Appl. No.: 401,097

[22] Filed: Aug. 30, 1989

Related U.S. Application Data

[63] Continuation-in-part of Ser. No. 339,506, Apr. 17, 1989, Pat. No. 4,901,445.

[51] Int. Cl.$^5$ .................. G01B 7/04; G01B 7/10
[52] U.S. Cl. ................................. 33/501.02
[58] Field of Search .......... 33/501.02, 501.03, 501.04, 33/783, 732, 733; 73/37.7

[56] References Cited

U.S. PATENT DOCUMENTS

| | | |
|---|---|---|
| 2,665,333 | 1/1954 | Dunipace et al. ............ 33/501.03 |
| 2,834,938 | 5/1958 | Cunningham ............... 33/501.03 |
| 3,164,981 | 1/1965 | Knobel . |
| 3,166,172 | 1/1965 | Kelsey et al. ................ 192/127 |
| 3,194,055 | 7/1965 | Knobel ........................ 73/37.5 |
| 3,357,241 | 12/1967 | King ............................... 73/159 |
| 3,528,002 | 9/1970 | Dunlavey . |
| 3,818,327 | 6/1974 | Alexander .................. 33/501.03 |
| 3,828,248 | 8/1974 | Wennerberg . |
| 3,855,524 | 12/1974 | Crawford . |
| 4,041,378 | 8/1977 | Ott ................................. 324/34 |
| 4,107,606 | 8/1978 | Typpo et al. . |
| 4,107,847 | 8/1978 | Typpo et al. . |
| 4,134,211 | 1/1979 | Typpo et al. . |
| 4,271,699 | 6/1981 | Williamson .................. 33/501.02 |
| 4,292,838 | 10/1981 | Larsen . |
| 4,574,634 | 3/1986 | Pappano ......................... 73/597 |
| 4,587,849 | 5/1986 | Gross .............................. 73/644 |
| 4,661,774 | 4/1987 | Montgomery . |
| 4,724,384 | 2/1988 | Castovilly et al. . |
| 4,739,249 | 4/1988 | Nyfors et al. ................ 324/58.5 |

FOREIGN PATENT DOCUMENTS

| | | |
|---|---|---|
| 0299716 | 1/1989 | European Pat. Off. . |
| 160322 | 6/1983 | Fed. Rep. of Germany . |
| 2382673 | 9/1978 | France . |
| 45373 | 2/1962 | Poland . |

OTHER PUBLICATIONS

Commonly assigned co-pending application Ser. No. 07/339,506.

Author unknown, "What's the Plus in MicroPlus? The most detailed profiles—ever," Mar. 1989 issue of *Pulp and Paper*, p. 71, place of publication unknown.

Author unknown, "Microscan Caliper Sensor (Contacting)," publication date unknown, bears 1989 U.S. copyright date, place of publication unknown.

*Primary Examiner*—William A. Cuchlinski, Jr.
*Assistant Examiner*—C. W. Fulton
*Attorney, Agent, or Firm*—Spensley Horn Jubas & Lubitz

[57] ABSTRACT

A contacting caliper gauge measures the thickness of a moving sheet material. The gauge has two heads, one on either side of the sheet. The sheet contacting pads of the caliper gauge are aerodynamically designed to limit and/or reduce the tendency of boundary layer air travelling with the sheet to raise the sheet-contacting pads off of the sheet surfaces.

11 Claims, 4 Drawing Sheets

AERODYNAMIC CALIPER GAUGE

This is a continuation-in-part of copending application Ser. No. 07/339,506 filed on Apr. 17, 1989 issued as U.S. Pat. No. 4,901,445.

BACKGROUND OF THE INVENTION

The present invention is directed to an apparatus and system for measuring a physical property, such as thickness, of a sheet material. The present invention is more specifically directed toward a caliper gauge for measuring the thickness of a sheet of paper which is in the process of being manufactured by a papermaking machine and, therefore, is moving at a high speed through the caliper gauge.

Various types of caliper gauges are known in sensor technology and are used for measuring the thickness of rapidly moving sheet material. One type of caliper gauge is called a "contacting caliper gauge". Contacting caliper gauges typically have two opposing pads which are forced into contact with opposite sides of the sheet. The distance between the pads is measured and directly related to sheet thickness or "caliper".

Under some situations, however, contacting caliper gauges may suffer from certain shortcomings. For example, United States paper manufacturers have formed an association (TAPPI) to promote uniform standards for the paper industry. Since paper is somewhat compressible, the TAPPI standard for measuring paper sheet caliper requires that the measurement be based upon results obtained from a contacting caliper gauge with a certain specified pressure exerted by the opposing pads on the paper sheet. Unfortunately, however, the requirement that a caliper gauge contact the sheet under pressure poses problems when the caliper of particularly lightweight, thin or weak paper is being measured. Under a fixed pressure, such sheets are prone to being torn by the sheet-contacting pads. This is particularly true when an imperfection or other portion of the sheet which abruptly increases in thickness is drawn rapidly through the caliper pads.

Another problem with such contacting caliper gauges is caused because modern paper mills manufacture paper sheet at high sheet speeds which can approach 60 MPH. Such a rapidly moving sheet drags a boundary layer of air along with it such that, near the surface of the sheet, the boundary layer of air is moving at the same speed as the sheet. As the sheet passes between the opposing caliper pads, an "air bearing" effect is created which tends to force the pads away from the surface of the sheet. In this situation, the pads are said to be "flying above" the sheet. Thus, at high paper speeds, the pads of a "contacting" caliper gauge may actually fail to contact the sheet. However, as previously mentioned, conventional caliper gauges determine sheet thickness based upon the measured distance between opposing pads. Thus, the flying effect can induce an erroneous caliper measurement by making the sheet appear thicker than it actually is. The flying problem increases as the sheet speed, and hence the speed of the boundary layer air, increases. In fact, conventional "contacting" caliper gauge designs tend to become airborne by up to about 40 microns at higher sheet velocities. Obviously, this is unacceptable when attempting to measure sheet caliper to within 1 micron accuracy under a wide range of sheet velocities.

Previously, caliper designers have given little, if any, consideration to aerodynamics in the design of the caliper pads. For example, certain prior caliper pads have been essentially disk-shaped, with smooth, rounded pad edges to avoid snagging the sheet. These pads tended to fly above the sheet. To avoid flying, the force on these pads was simply increased. However, increasing the force on the contacting caliper pads to counteract the flying effect has not proved to be a satisfactory solution. Increasing the force on opposing pads will tend to counteract the flying effect resulting from the fast moving boundary layer air, but this increased force also increases the tendency of the pads to tear the sheet. Accordingly, the present inventors have recognized the need for a contacting caliper gauge which will remain in contact with the sheet surface (or fly only a very small distance off of the sheet surface) under relatively little external force, while having little or no tendency to tear the sheet.

SUMMARY OF THE INVENTION

The present invention relates to a sheet caliper gauge for measuring the thickness of a sheet material while it is moving rapidly in the direction from the front to the back of the gauge. The gauge comprises upper and lower pads disposed adjacent to, respectively, upper and lower surfaces of the sheet to be measured. The pads are held directly opposite each other, and each pad is forced against the sheet by an elastic extendible member, such as an inflated bellow. Because the elastic members place the pads in forcible contact with the rapidly moving sheet, it will usually be desirable to make the pads out of abrasion resistant material.

Each pad has a sheet-contacting surface disposed substantially parallel to the sheet. However, the sheet-contacting surface is preferably beveled near the front portion of the gauge so that the opposing pads together form a V-shaped guide for the entrance for the sheet material between the pads. This reduces the probability of tearing the sheet.

As previously explained, the traveling boundary layer of air will tend to create an air bearing which raises each pad off of the sheet surface. However, according to the present invention, this tendency of the pads to fly off of the sheet is reduced or eliminated by providing the sheet-contacting surfaces of such pads with grooves. The grooves are cut in the sheet-contacting surface of the pads lengthwise along the direction of travel of the sheet, i.e., along the "machine direction". Such grooves vent out the air from the air bearing, and thereby reduce or prevent flying.

Alternatively, or in combination with such grooves, there may be formed a notch in one or both of the opposing pads. This notch is formed in the sheet-contacting surface of a pad and is shaped such that the notch is narrower, and/or more shallow, toward the front portion of the pad and widens and/or deepens toward the back of the pad. The notch further preferably has its widest and/or deepest part at the back surface of the pad. Such a tapered notch in the sheet-contacting surface of the pad requires boundary layer air rushing between the pad and the sheet to fill an ever increasing volume as it moves from the front to the rear of the pad, thereby creating a partial vacuum in the notch.

The partial vacuum created in the notch tends to force the pad against the sheet. Such a vacuum is proportional to sheet velocity. The lift caused by the boundary layer air is also proportional to sheet velocity.

Thus, by properly sizing and shaping the notch, the partial vacuum created in the notch can be made to substantially counteract the speed dependent lifting force of the boundary layer air over a wide range of sheet speeds. Accordingly, the sheet-contacting pads of the present invention remain either in contact with the sheet surface over a broad range of sheet speeds, or fly only a very small distance off of the sheet over a broad range of sheet speeds. Thus, by measuring the distance between the opposing pads, the present invention provides an essentially speed-independent sheet caliper measurement which need not be corrected for flying of the pads above the sheet surface.

BRIEF DESCRIPTION OF THE DRAWINGS

FIG. 2b is an enlarged view of the caliper pads of FIG. 2a.

DETAILED DESCRIPTION OF THE DRAWINGS

Figure 1:
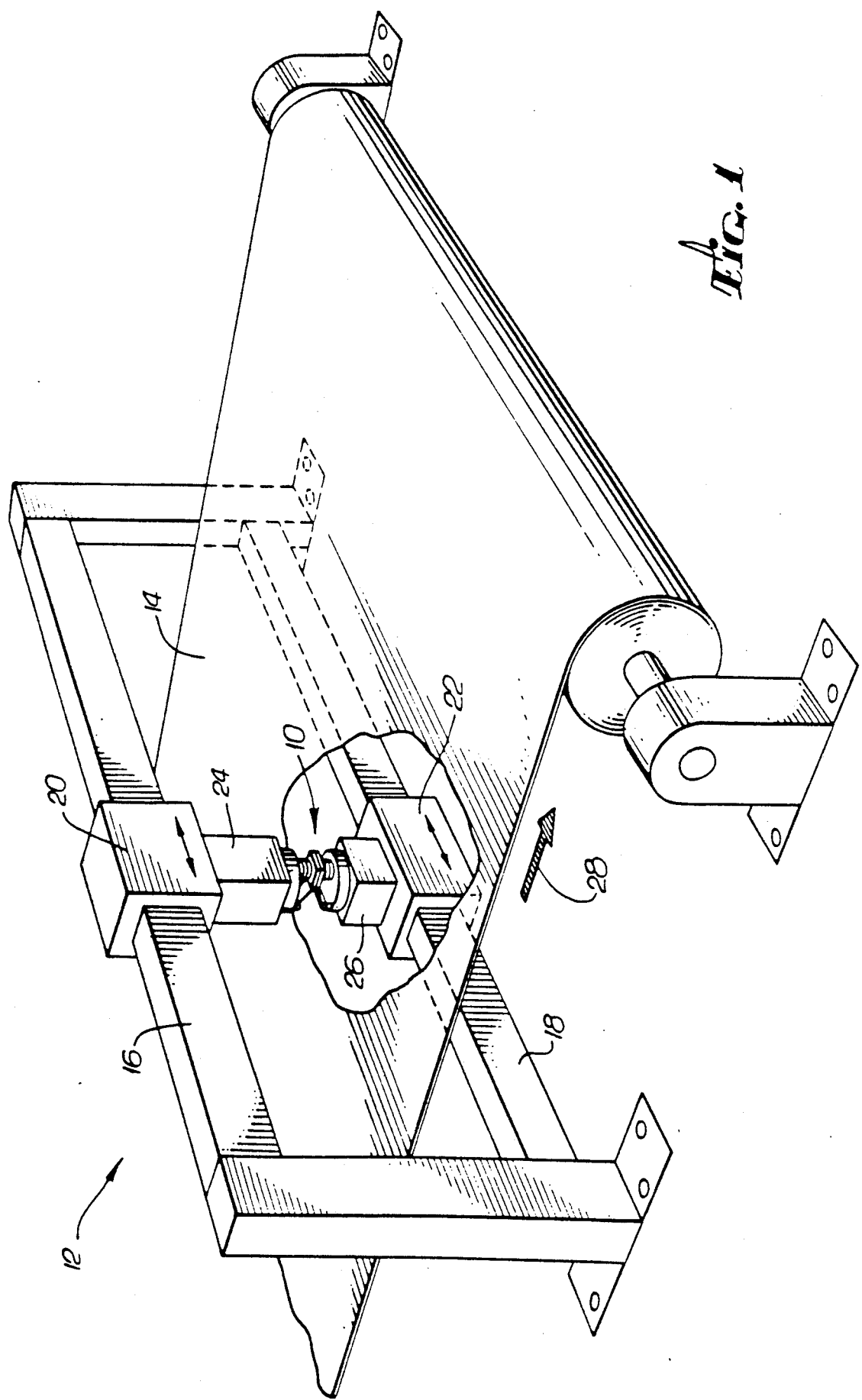
FIG. 1 is a simplified perspective view of a sheet scanning station having a caliper gauge mounted thereto for measuring sheet thickness immediately before the sheet is collected on a reel. Part of the sheet is removed to better illustrate the lower opposing portion of the caliper gauge.

FIG. 1 illustrates one embodiment of the sheet thickness or caliper gauge 10 of the present invention mounted to a scanner 12 which traverses or scans back and forth across the longitudinally moving paper sheet 14 being produced by a papermaking machine (not shown). The scanner 12 is of a now conventional type, such as that described in commonly assigned U.S. Pat. No. 3,621,259 to Mathew G. Boissevain. This patent is incorporated herein by reference.

The scanner 12 consists generally of a framework having a pair of spaced upper 16 and lower 18 beams and carriages 20, 22 which move back and forth across the beams 16, 18 in opposed relationship. The upper carriage 20 carries the upper head 24 of the caliper gauge 10, while the lower carriage 22 carries the lower head 26 of the caliper gauge 10. The two carriages, 20, 22, and thus the two caliper heads, 24, 26, are juxtaposed to provide a gap therebetween through which the paper sheet 14 whose thickness is to be measured freely moves. Although FIG. 1 merely shows the caliper gauge 10 used to measure paper thickness, the carriages 20, 22 would typically also carry additional devices for measuring various other physical characteristics of the paper sheet 14.

Figure 2A:
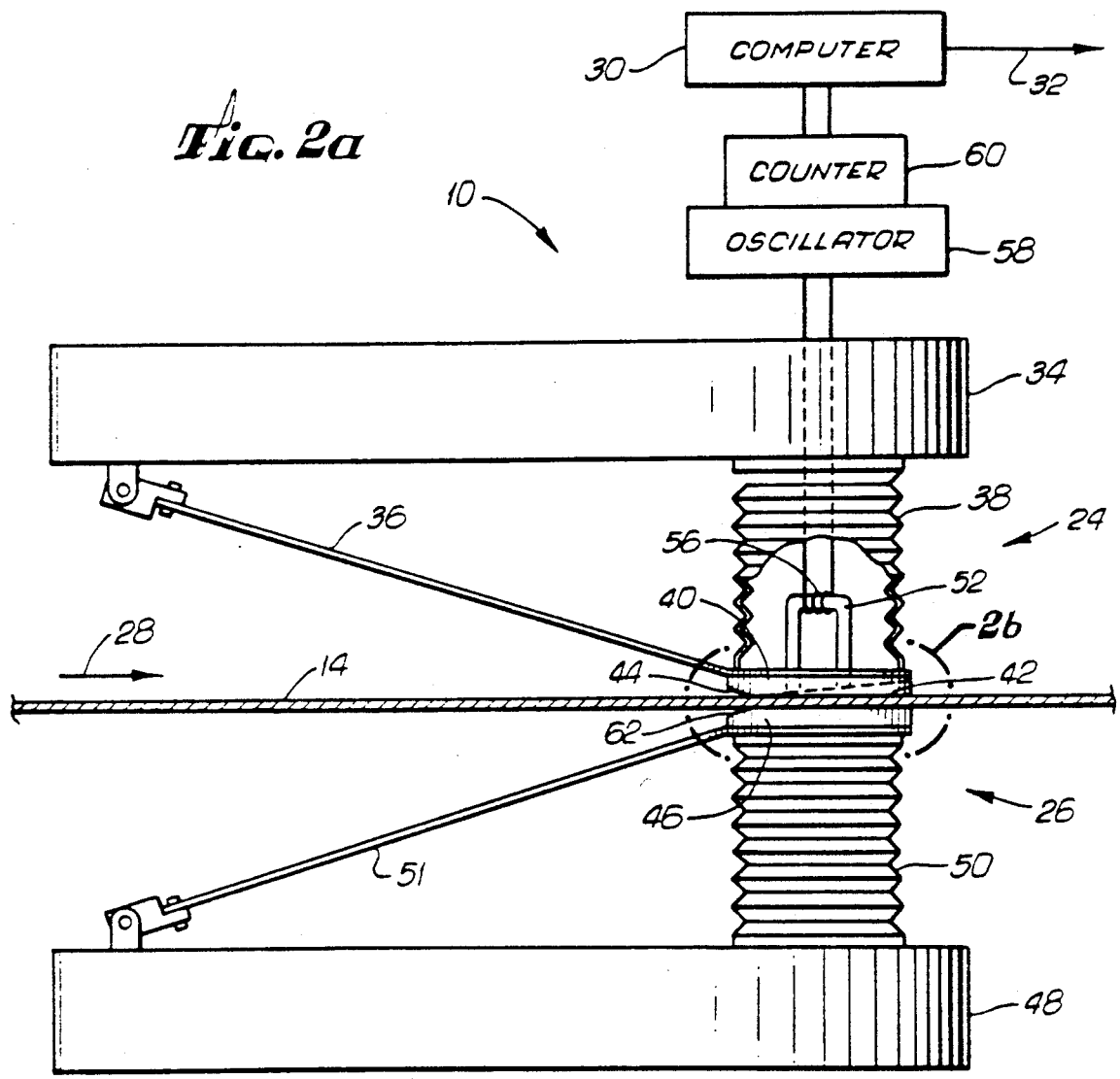
FIG. 2a is a schematic cross-sectional view of one embodiment of the caliper gauge of the present invention.

FIG. 2a illustrates, in partial cross-section, the upper and lower heads 24, 26 of the present caliper gauge 10. The paper sheet 14 moves rapidly between the upper and lower heads 24, 26 in the "machine direction", i.e., the direction shown by the arrow 28. Thus, the paper sheet 14 moves from the front of the gauge to the rear of the gauge.

As the caliper gauge 10 is scanned back and forth across the moving paper sheet 14, signals from the gauge 10 are provided, via signal processing circuitry, to the central paper machine process control computer 30. Utilizing these signals, the computer 30 computes a sheet thickness profile. The sheet thickness profile is then used by the computer 30 to adjust various sheet processing parameters to create a sheet having a desired uniform thickness. FIG. 2a illustrates that output signals 32 from the computer 30 may be used to adjust various devices (not shown) on the papermaking machine to achieve the desired thickness.

The upper head 24 of the caliper gauge 10 includes a sturdy, relatively massive base 34 mounted to the upper carriage 20. One end of a support arm 36 is hinged at the front of this base 34. The other end of the support arm is hinged at the bellow 38. The bellow 38 connects the other end of the support arm 36 to the base 34 near the back of the gauge 10. The bellow 38 is disposed substantially perpendicular to the paper sheet 14. A sheet-contacting pad 40 is attached to the distal end of the bellow. This pad 40 has a sheet-contacting surface 42 which is substantially parallel to the sheet 14 near the back of the gauge 10, but which has an inclined portion 44 near the front of the gauge 10 to guide the paper 14 between the pads 40, 46. When pressurized, the bellow 38 forces the pad 40 toward contact with the upper surface of the the sheet 14.

The lower head 26 is similar in mechanical construction to the upper head 24. Like the upper head 24, the lower head 26 includes a second sturdy, relatively massive base 48, a second sheet-contacting pad 46 and a second bellow 50. Each of these elements are connected in substantially the same manner as that described above for the upper head 24, except, of course, that the lower base 48 is mounted to the lower carriage 22.

The upper and the lower heads 24, 26 are positioned such that the upper bellow 38 and the lower bellow 50 are in a substantially linear opposing relationship. Thus, during operation of the gauge 10, the upper pad 40 and the lower pad 46 would be disposed in substantial opposing relationship on opposite sides of the sheet 14.

In general, any extendible means could be used in place of each bellow. However, a bellow is preferred because the electro-magnetic circuit used to measure the thickness of the sheet material may be placed within the hollow interior of the bellow. One such circuit is fully described in commonly assigned U.S. Pat. No. 3,828,284 to Gunnar Wennerberg, which is incorporated herein by reference. Briefly, however, the caliper gauge 10 is equipped with an electro-magnetic proximity sensing device for accurately measuring the distance between the opposing pads 40, 46. This device includes an electro-magnet 52 mounted to the upper pad 40 and disposed within the upper bellow 38. This upper pad 40 is preferably formed of a highly abrasion resistant, non-magnetic material, such as sapphire. The lower pad 46 is formed of a magetically susceptible abrasion resistant material, such as ferrite, preferably coated with sapphire or diamond. The pads 40, 46 are preferably abrasion resistant to avoid excessive wear caused by the friction between the moving sheet 10 and the sheet-contacting surfaces 42, 54 of the pads 40, 46.

The coil 56 surrounding the core of the electro-magnet 52 may be electrically connected to an oscillator circuit 58 and used as the inductance of that circuit 58. Thus, movement of the magnetically susceptible ferrite pad 46 toward and away from the coil 56 with sheet thickness changes, changes the inductance of the coil 56 and hence the resonant frequency of the oscillator circuit 58. A frequency counter 60 is operatively coupled to the oscillator 58 to determine its resonant frequency. The counter 60 then sends a signal to the computer 30 indicative of this resonant frequency. The computer 30 computes the distance between the electro-magnet 52 and the ferrite pad 46, and hence sheet thickness, based upon this resonant frequency.

Figure 2B:
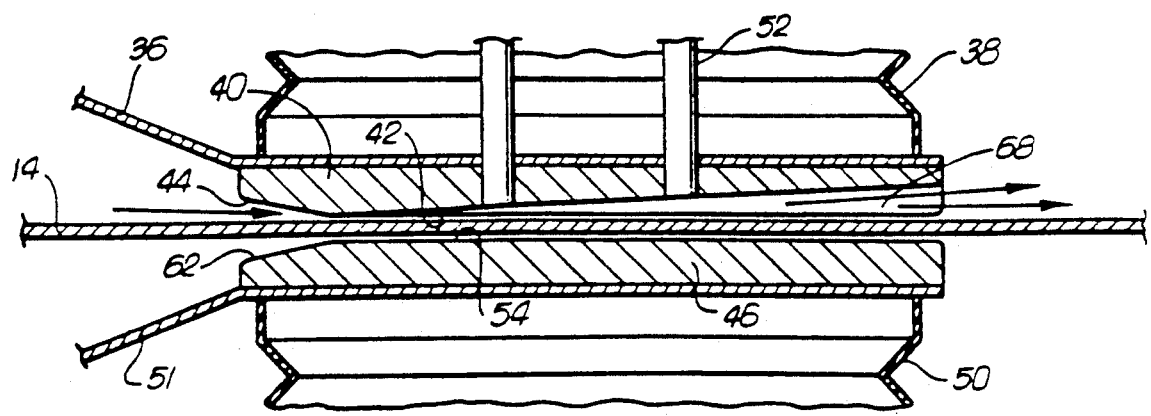

It is particularly preferred that the upper pad 40 be abrasion resistant. This is because, as illustrated in FIG. 2b, the electro-magnet 52 is recessed within the pad 40. The proximity sensing circuits are calibrated with the unworn pad. Therefore, if the sheet-contacting surface 42 of the pad 40 is worn down, the poles of the electro-magnet 52 will move closer to the sheet 14 and produce an erroneous thickness measurement or tear the sheet.

There are a number of advantages to the gauge 10 of the present invention which make it well suited to the measurement of the thickness of thin, weak or otherwise easily damaged material, such as tissue paper.

The first advantage is that, with the subject gauge 10, the only elements which respond to sheet thickness variations are the bellows 38, 50, through contraction or elongation, the arms 36, 51, the pads 40, 46 and the electro-magnet 52 which move with the bellows 38, 50. The bellows 38, 50 are much less massive than the upper 34 and lower 48 bases. Therefore, the lighter, less massive and therefore more easily movable bellows 38, 50 reduce the likelihood of tears during the measurement process when there is a rapid thickness variation in the sheet 14, such as might occur at a sheet imperfection. Also, the arms 36, 51 are preferably made of a strong, lightweight material, such as mylar, to further reduce the total mass of the moving parts of the gauge 10.

Another advantage of the gauge 10 is the combination of the opposing inclined or beveled portions 44, 62 of the upper and lower pads 40, 46. Together, these inclined portions 44, 62 form a V-shaped guide for the entrance of the sheet 14 material between the pads 40, 46. As can best be seen in FIGS. 3-4, discussed more fully below, the pads are preferably rectangular. Therefore, the V-shaped inclined rectangular front portions 44, 62 distribute force evenly over the entire width of the pads 40, 46. This even distribution of pressure over the entire width of the rectangular pads decreases localized forces between the sheet 14 and the pads 40, 46, thereby still further reducing the probability of tearing the sheet 14.

Further, as described in greater detail below, the aerodynamic action of the pad minimizes and/or completely counteracts the lifting action of the air bearing effect previously discussed.

Figure 3:
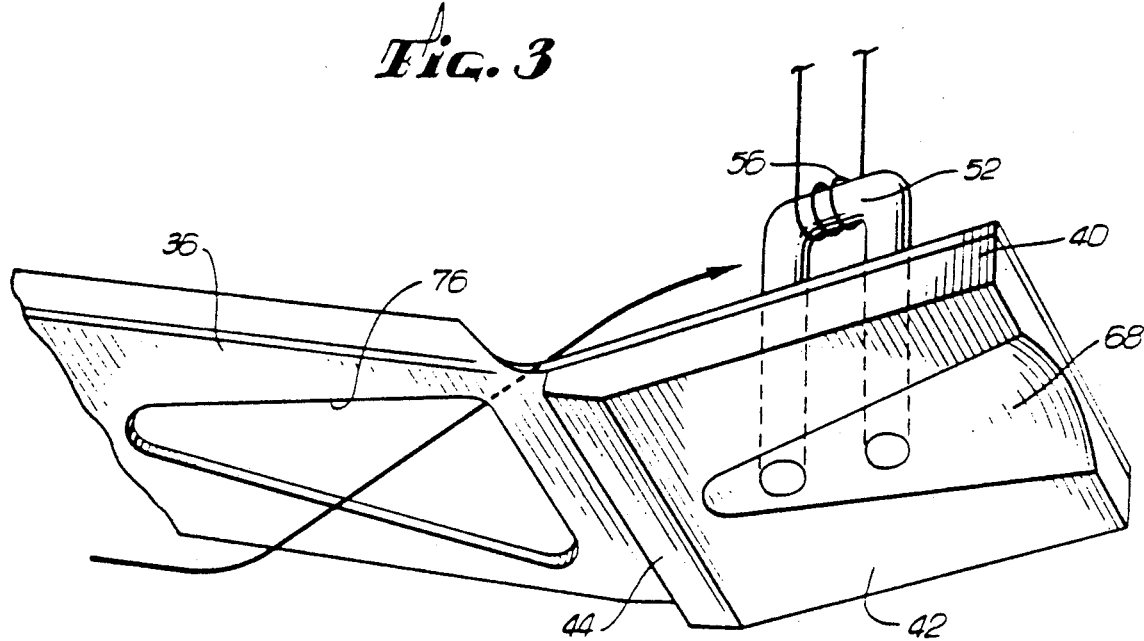
FIG. 3 illustrates, in perspective, the aerodynamically designed upper caliper pad of FIGS. 2a and 2b.

FIG. 3 illustrates one aerodynamic pad design 40. The pad 40 may be 0.75 inch wide measured along the "cross-direction" perpendicular to the direction of sheet movement, by 1.00 inch along the machine direction, by 0.03 inch thick. The front of the pad 40 preferably has a 0.12 inch long 2° inclined surface 44 measured relative to the plane of the sheet 14. The central and back portions of the sheet-contacting pad 40 surface have a "vacuum notch" 68 formed therein.

As previously discussed, a boundary layer of air travels with the sheet 14 as the sheet 14 passes between the two opposing pads 40, 46. This boundary layer of air will tend to lift the pads 40, 46 off the surfaces of the sheet, thereby producing a false sheet thickness measurement. With the aerodynamic pad design of FIG. 3, as the sheet speed is increased, the boundary layer of air first forces itself between the pad 40 and the sheet 14 near the front portion of the pad 44, thereby tending to raise the pad 40 off of the surface of the sheet 14. However, as the boundary layer reaches the vacuum notch 68 and continues to travel toward the back of the gauge 10, it is forced to fill an ever increasing volume (see e.g., FIG. 2b), thereby creating a partial vacuum within the notch 68 between the pad 40 and the sheet 14. This partial vacuum pulls the pad 40 back toward the sheet 14, thus counteracting the air bearing effect. Moreover, as the speed of the sheet 14, and hence the air bearing effect, increases, the partial vacuum formed in the vacuum notch 68 also increases, thereby tending to cancel the increasingly strong air bearing effect. The net result is that, with the pad design of FIG. 3, the tendency of the pad 40 to fly off of the sheet will be reduced or eliminated over a wide range of paper speeds. In the illustrated embodiment of FIG. 3, the vacuum notch 68 is 0.80 inch long and increases to 0.40 inch wide and 0.018 inch deep at the rear surface of the pad 40. However, the dimensions of the notch 68 and pad 40 may be adjusted for use in different manufacturing situations to provide the desired pressure between opposing pads. All else being equal, a wider and/or deeper vacuum notch will provide a greater partial vacuum than a narrower, more shallow vacuum notch. In fact, the "notch" may actually extend at all points across the entire width of the pad so that the entire rear portion of the sheet-contacting pad surface is inclined away from the sheet surface. Whatever dimensions are chosen, all pad surfaces should be smooth to avoid build-up of paper dust which could cause an erroneous measurement.

We have found that an appropriate method of creating the vacuum notch 68 is by grinding the pad 40 with a grinding wheel having an 1.5 inch diameter. The grinding wheel is oriented with its axis of rotation located parallel to the machine-direction axis of the pad and about one degree from a plane parallel to the face of the pad 40. Then the grinding wheel is moved from one end of the pad to the other so that the notch 68 is formed having the shape of a section of a cylinder.

Pads of identical design may, if desired, be used on both the upper 24 and lower 26 heads of the caliper gauge 10. However, in certain situations, it may only be necessary to use the pad design of FIG. 3 on one of the two heads. The opposing head may simply be formed with a pad having a flat sheet-contacting surface, as shown in FIGS. 2a and 2b. These figures illustrate a caliper gauge 10 wherein only the upper head 24 utilizes a pad 40 having a vacuum notch 68. Despite the fact that a vacuum notch 68 is formed in only one of the two opposing pads, the partial vacuum created on one side of the sheet 14 by the vacuum notch 68 will nevertheless also cause a low pressure region on the opposite side of the sheet. This low pressure region on the opposite side of the sheet 14 also tends to force the opposing flat-surfaced pad 46 toward the sheet. Thus, although only a single pad need be formed with an aerodynamic vacuum notch, the resulting partial vacuum will force both pads 40, 46 toward contact with the sheet 14.

The low pressure region between the sheet 14 and the flat-surfaced pad 46 may be caused by one or both of the following effects. First, if the sheet is porous, like many paper sheets, the boundary layer air between the sheet 14 and the flat-surfaced pad 46 will be sucked through the porous sheet 14 toward the vacuum notch 68, thereby causing a partial vacuum in the space between the sheet 14 and the lower pad 46. Alternatively, or in addition, even if the sheet 14 is not porous, the sheet 14 will tend to be sucked into, and therefore conform to the shape of the vacuum notch 68. Thus, the sheet itself will obtain a aerodynamic shape which will create a partial vacuum adjacent the flat-surfaced opposing lower pad 46. In either event, both pads 40, 46 will be drawn toward the sheet 14 by an aerodynamically created partial vacuum.

Figure 4:
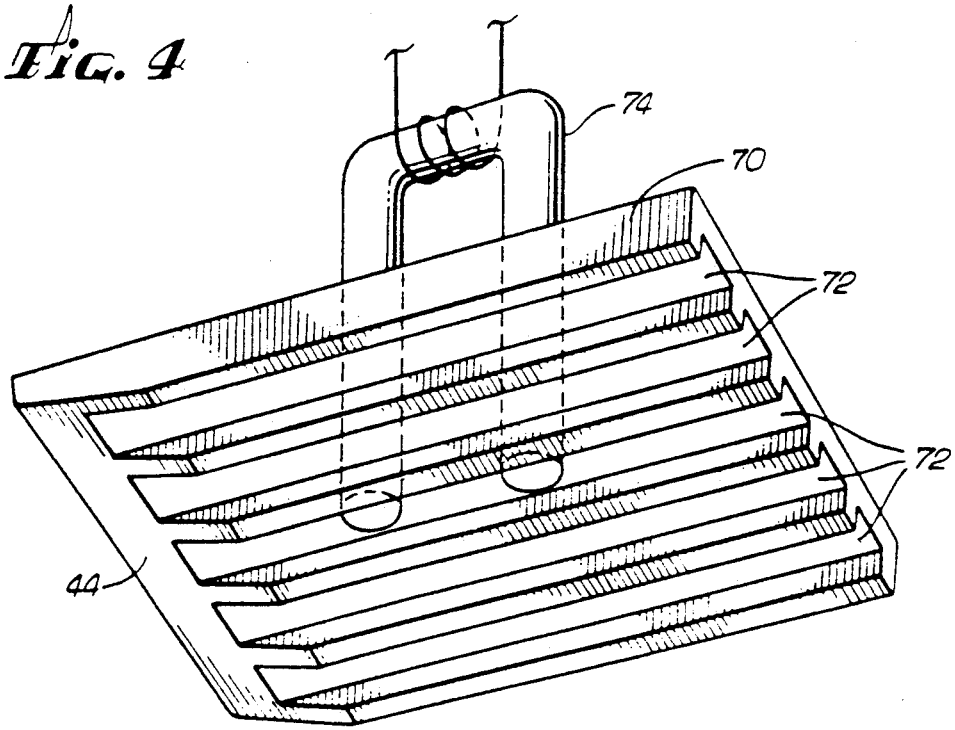
FIG. 4 illustrates, in perspective, an alternative design of the caliper pad.

FIG. 4 illustrates, in perspective, an alternative design for the sheet-contacting pad 70. According to this design, grooves 72 are cut in the pad 70 lengthwise along the machine direction. These grooves 72 extend from the front to the back of the pad 70. Five evenly spaced 72 grooves may be formed in the pad 70, each groove 72 being 0.005 inch deep and 0.040 inch wide. These grooves 72 are spaced at ⅛ inch intervals. The overall length, width and thickness of the pad 70 is the same as that for the above-described embodiment of FIG. 3.

The grooves 72 cut in the pad 70 of FIG. 4 provide channels for the boundary layer air to flow between the pad 70 and the sheet 14, while still permitting portions of the pad 70 to remain in contact with the sheet. This release, or venting, of boundary layer air through the machine directionally oriented grooves 72 improves contact with the sheet, and therefore caliper accuracy. As in the embodiment of FIGS. 2-3, one or both of the opposing pads may include the grooves 72. Also, as in the embodiment of FIG. 2-3, one pad will be made of a magnetically susceptible material, while the opposing pad will have an electro-magnet 74 for determining the distance between the two pads. Whichever pad design is utilized, the magnetically susceptible pad should be sufficiently broad in lateral extent that slight lateral misalignments between the upper and lower heads 24, 26 will not induce a falsely large caliper measurement. In operation, the sheet 14 is threaded between the opposing caliper heads 24, 26 and the central paper mill process control computer 30 instructs the scanning station 12 to begin scanning the caliper gauge 10 back and forth along the cross-direction of the sheet 14. The bellows 38, 50 are pressurized to place the pads in forcible opposing contact with the sheet 14. A pressure of about 2-4 inches of water (gauge) in 1 inch diameter bellows will provide sufficient pressure to maintain the pads of FIG. 3 in contact or very close proximity (less than about 2 microns) to the sheet over a relatively wide range of sheet speeds. A pressure of about 5-7 inches of water (gauge) in the same size bellows will suffice to maintain the pads of FIG. 4 in contact or in very close proximity with the sheet over a relatively wide range of sheet speeds. Of course, higher bellows pressures may be used with stronger, less easily damaged sheets. Sheet caliper measurements are performed by the proximity sensing electronics, as discussed above.

As the sheet speed increases, a rapidly moving boundary layer of air will form near the opposing sheet surfaces and attempt to lift the pads away from contact with the sheet. The aerodynamically designed pads of the present invention will counter this effect. However, in addition, air pressure may also build up on the inner front surfaces of the upper 36 and lower 51 arms. Such pressure would also tend to raise the pads off of the sheet 14. However, the arms 36, 51 are designed with vent holes 76 (FIG. 3) which allow the air to flow through the arms, 36, 51, thus relieving the pressure and, again, minimizing the tendency of the pads to fly off of the sheet surfaces. These vent holes 76 also reduce the total weight of the moving parts of the caliper gauge 10 and, therefore, make it more responsive to rapid changes in sheet thickness with reduced risk of tearing the sheet.

Figure 5:
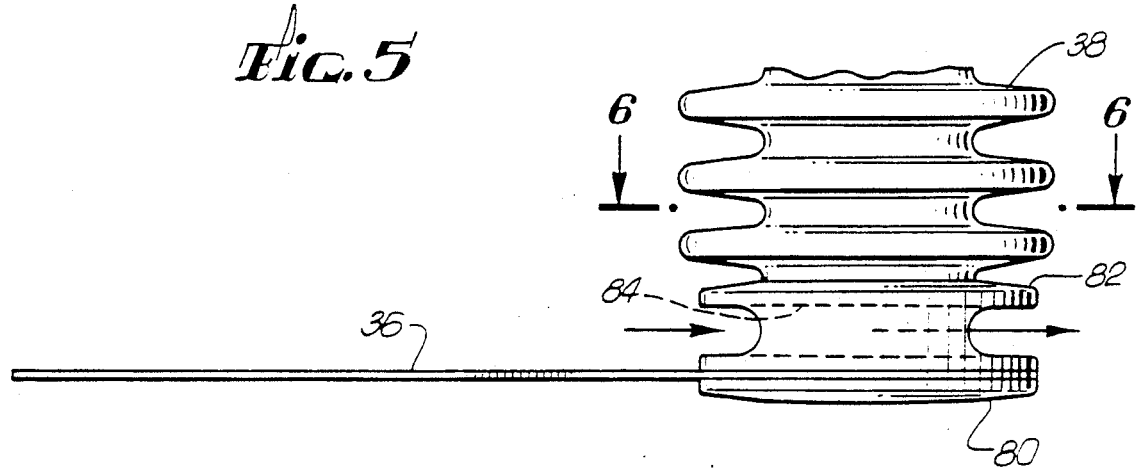
FIG. 5 is a schematic view of another alternative design of the caliper.

FIG. 5 illustrates another alternative design for the sheet contacting pad. According to this design, a contacting part 80 of the pad 40 is affixed below the support arm 36. The pad 40 also includes an upper part 82 affixed to the support arm 36 above the contacting part 80. The bellow 38 is connected to the upper part 82. A tunnel 84 is formed in the upper part 82 extending parallel to the direction in which the sheet travels so that the boundary layer can pass through the tunnel as indicated by the arrows. The electromagnet 52 is mounted to extend through the tunnel 84, and the electromagnet 52 is encased in silicone rubber cement 86, but for clarity these items are shown in FIG. 6, and not in FIG. 5.

Figure 6:
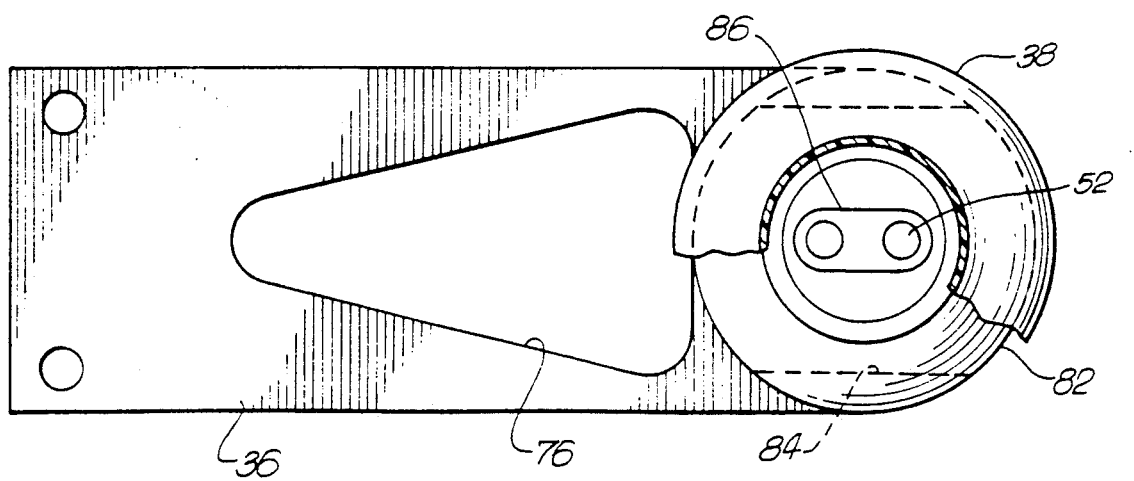
FIG. 6 is a cut-away view of the caliper in FIG. 5, taken along line 6—6.

FIG. 6 illustrates a top view of the design shown in FIG. 5 with part of the bellow 38 cut away.

Three preferred embodiments of the present invention have been described. Nevertheless, it will be understood that various modifications may be made without departing from the spirit and scope of the invention. For example, either of the pads illustrated in FIGS. 3 and 4 may be used with a single caliper head, or on both opposing caliper heads. A pad having, in combination, both one or more machine directionally oriented grooves and one or more vacuum notchs would be well within the scope of the present invention. Also, grooves and vacuum notches of varying sizes and shapes are also within the scope of the invention. Moreover, the present invention is also not limited to use with paper sheet nor to use with electro-magnetic proximity sensing devices. Other sheet material and other proximity sensing devices may be used. Furthermore, physical characteristics of the sheet other than thickness may be measured with the disclosed invention. Thus, the present invention is not limited to the preferred embodiments described herein, but may be altered in a variety of ways which will be apparent to persons skilled in the art.

We claim:

1. A caplier gauge for measuring a physical property of a moving sheet material having a boundary layer, the gauge comprising:
   a first base;
   an extendible member having one end connected to the base;
   a first pad mounted to the end of the extendible member opposite the first base; and
   first aerodynamic means for reducing the force exerted by the boundary layer which tends to force the first pad away from the moving sheet.

2. A caliper gauge according to claim 1, further comprising:
   a second base located to the side of the sheet opposite said first base;
   an extendible member having one end connected to said second base;
   a second pad mounted to the end of the extendible member opposite said second base; and
   second aerodynamic means for reducing the force exerted by the boundary layer which tends for force the second pad away from the moving sheet.

3. A caliper gauge according to claim 1, wherein the first aerodynamic means includes an indentation formed in the first pad.

4. A caliper gauge according to claim 1, wherein the first aerodynamic means includes a tunnel formed in the first pad.

5. A caliper gauge for measuring a physical property of a moving sheet material having a boundary layer, the gauge comprising:
 a base;
 an extendible member having one end connected to the base;
 a pad mounted to the end of the extendible member opposite the base; and
 support means connecting the pad to said base, the support means including a port for allowing boundary layer air to flow through the support means.

6. An aerodynamic sheet contact pad, the pad having a tunnel to allow boundary layer air to flow through the pad.

7. An aerodynamic sheet contact pad, the pad having front and back portions and a first side, the first side including a first surface for contact with the sheet and at least one indentation in the first surface extending from the back end of the pad to a location along the first surface spaced from the back end of the pad, wherein the indentation, measured across the first surface, increases in size toward the back end of the pad.

8. The sheet contact pad of claim 7, wherein the indentation increases in depth toward the back end of the pad.

9. A caliper gauge for measuring a physical property of a sheet material, the gauge comprising:
 a base;
 an extendible member having one end connected to the base; and
 a pad mounted to the end of the extendible member opposite the base, the pad having a side opposite the base and a front and back end, wherein the side includes a surface for contact with the sheet having an indentation extending from the back end of the pad to a location along the surface spaced from the back end of the pad, and wherein the indentation, measured across the surface, increases in size toward the back end of the pad.

10. The caliper gauge of claim 9, wherein the indentation increases in depth toward the back end of the pad.

11. An aerodynamic sheet contact pad, the pad having a front end, a back end and a side including a surface for contact with the sheet, the side having an indentation in the surface extending from the back end of the pad to a location along the surface spaced from the back end of the pad, and wherein the indentation extends less than the entire distance across the surface at the location spaced from the back end of the pad and increases in size toward the back end of the pad.

* * * * *